Figure 1:
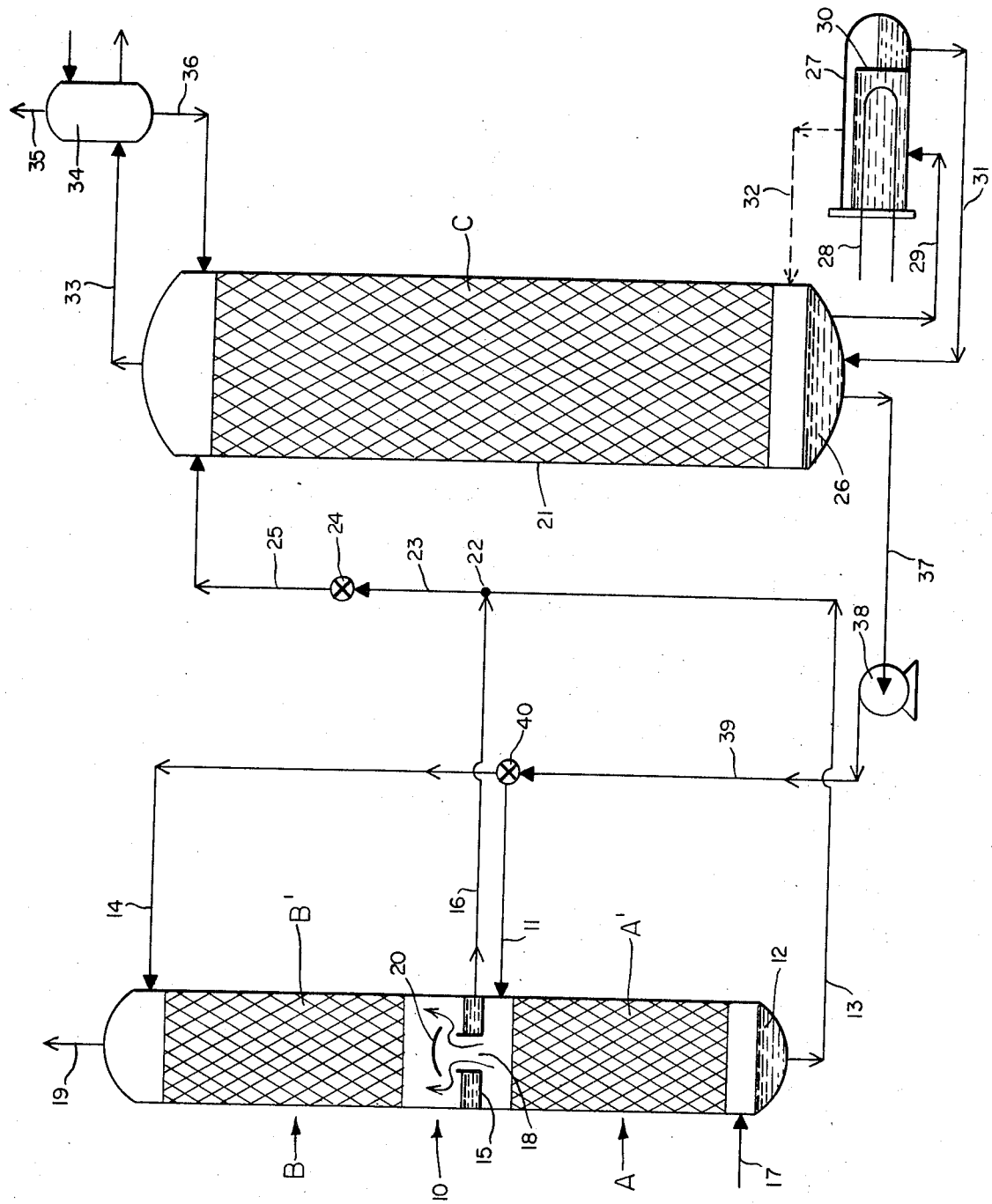

United States Patent
Benson

[15] 3,642,430
[45] Feb. 15, 1972

[54] SEPARATION OF CARBON DIOXIDE AND HYDROGEN SULFIDE FROM GAS MIXTURES

[72] Inventor: Homer E. Benson, Pittsburgh, Pa.
[73] Assignee: Benson, Field and Epes
[22] Filed: Sept. 19, 1969
[21] Appl. No.: 859,324

[52] U.S. Cl. ................................................23/2 R
[51] Int. Cl. ................................................B01d 53/34
[58] Field of Search ................23/2, 2 A, 3, 3 LA, 181, 150

[56] References Cited

UNITED STATES PATENTS 3,144,301  8/1964  Mayland ................................23/2

FOREIGN PATENTS OR APPLICATIONS 1,497,042  8/1967  France ................................23/2
1,086,453  10/1967  Great Britain ................................23/2

OTHER PUBLICATIONS

Perry, "Chemical Engineers' Handbook," McGraw-Hill Book Company, Inc., 3rd Ed. 1950, pp. 707-711.

*Primary Examiner*—Earl C. Thomas
*Attorney*—William M. Epes

[57] ABSTRACT

A method permitting the reduction of absorber cross-sectional area when removing $CO_2$ and/or $H_2S$ from gas mixtures containing a high partial pressure of such acid gases by means of regenerable aqueous alkaline scrubbing solutions. The gas mixture is contacted with the scrubbing solution in an absorption stage maintained under substantial superatmospheric pressure and containing at least two absorption zones. Each absorption zone is separately supplied with approximately equal, separate streams of regenerated scrubbing solution, and separate streams of spent scrubbing solution are withdrawn from the bottom of each absorption zone. The gas mixture to be purified passes successively through the separate absorption zones with approximately equal quantities of acid gas being absorbed in each zone. The scrubbing solution is regenerated at reduced pressure and recycled to the absorption zone.

6 Claims, 2 Drawing Figures

INVENTOR.
Homer E. Benson
BY
ATTORNEY.

SEPARATION OF CARBON DIOXIDE AND HYDROGEN SULFIDE FROM GAS MIXTURES

This invention relates to the removal of carbon dioxide and hydrogen sulfide from gas mixtures containing a high partial pressure of such acid gases.

It is often desired to treat large streams of industrial gases containing high partial pressures of $CO_2$ and/or $H_2S$. Such gas mixtures are, for example, found in many natural gas deposits where the gas at the wellhead may be at a pressure of 1,000 pounds per square inch and contain from e.g., 5 percent to 50 percent of $CO_2$ and/or $H_2S$. Synthesis gases (such as hydrogen and ammonia synthesis gas) are most commonly produced by the high-pressure reforming or partial oxidation of natural gas, liquid fuels, or solid, carbonaceous fuels, producing raw gas mixtures at pressures typically of 250 to 1,000 pounds per square inch, containing typically 15 percent to 35 percent $CO_2$ and, in some cases, small amounts of $H_2S$. In industrial plants often millions of cubic feet per hour of such gas mixtures are treated for the removal of most or substantially all of their $CO_2$ and $H_2S$ content.

The most widely used industrial process for the separation of $CO_2$ and $H_2S$ involves the use of regenerable aqueous alkaline scrubbing solutions, such as aqueous ethanolamine or potassium carbonate solutions, which are continuously circulated between an absorption zone generally operated under substantial superatmospheric pressures where acid gases are absorbed, and a regeneration zone operated at approximately atmospheric pressure where they are desorbed, usually by steam-stripping. In the more efficient of such methods, the absorption and regeneration stages are operated, at least for the most part, at the same temperatures, namely at temperatures in the vicinity of the atmospheric boiling temperature of the scrubbing solution, thus eliminating the otherwise high heat losses that result when the solution is alternately heated and cooled between the absorption and regeneration stages.

In the operation of such processes, it is highly desirable to treat the large volumes of raw gas in a single train rather than a number of parallel trains. A single-train plant, where one large gas stream is treated in one pass rather than being divided into a number of parallel gas streams which are separately treated, is highly preferable since this substantially reduces the number of vessels, and the quantity of piping, valves, and instrumentation required.

As single-train gas-scrubbing plants become larger and larger, it has been found that the absorber columns which operate under substantial superatmospheric pressures, become immoderately large in cross-sectional area in order to accommodate the high flows of gas and liquid passing through the absorber column. Since the absorbers are thick-walled pressure vessels, they become increasingly difficult to fabricate in large diameters and, after fabrication, become increasingly difficult to transport to the plant site due to their very large size and weight; and sometimes must be fabricated on the plant site, itself. As the absorber diameter increases, there is also a considerable increase in the problems of maintaining uniform distribution of the liquid flow over the packing in packed columns, or of maintaining even distribution of liquid over large plate areas in plate columns. As the diameter becomes large, heavy structural members must be employed to support the trays or packing, and such heavy structural members take an increasing amount of expensive internal volume of the absorber column.

A new method has now been found for treating gas mixtures containing high partial pressures of carbon dioxide and/or hydrogen sulfide which permits the use of absorber columns of markedly reduced cross-sectional area, thus making it practicable to treat large streams of such gas mixtures in a single train rather than in two or more parallel trains.

According to the invention, the gas mixture containing a high partial pressure of $CO_2$ and/or $H_2S$ is contacted with an aqueous alkaline scrubbing solution in an absorption stage maintained under substantial superatmospheric pressure and containing at least two absorption zones. Each absorption zone is supplied with approximately equal, separate streams of regenerated scrubbing solution, and each of said streams is separately withdrawn from the bottom of each absorption zone in a spent condition. The gas mixture to be treated is passed successively through separate absorption zones in contact with the separate streams of scrubbing solution while absorbing equal quantities of acid gas in each of the absorption zones. The spent scrubbing solution from the absorption zones is regenerated at a reduced pressure in the vicinity of atmospheric and is then recycled in a regenerated condition to the absorption zones.

By operation in accordance with the invention, the absorber cross-sectional area may be reduced in typical cases by from 40 percent to 60 percent. This results from the fact that the liquid flow rate through any given section of the absorber column is greatly reduced which in turn reduces the tendency of the column to flood. This permits a marked increase in the gas flow per unit of cross-sectional area of the absorber column and allows reduction in the column cross-sectional area. Reduction in cross-sectional area in turn eases the problem of uniformly distributing scrubbing solution over the packing or plates employed to provide intimate gas-liquid contact. By sharply reducing column diameter, the complexity and frequency of distributors and redistributors down the length of the column can be reduced. Similarly, the size of the structural support members for the plates or packing can be markedly reduced due to the shorter span across the column. Both of these latter factors provide considerable reduction in the volume of the absorber column taken up by such distribution and support means. Accordingly, although the column height must be somewhat increased to provide an adequate volume of packing or plate area, the overall increase in height is minimized due to such reductions in volume for distributors and structural members as discussed above.

Reference is now made to the accompanying drawings which describe preferred embodiments of the invention wherein FIG. 1 is a diagrammatic flow sheet illustrating one embodiment of the invention employing two separate absorption zones.

Figure 2:
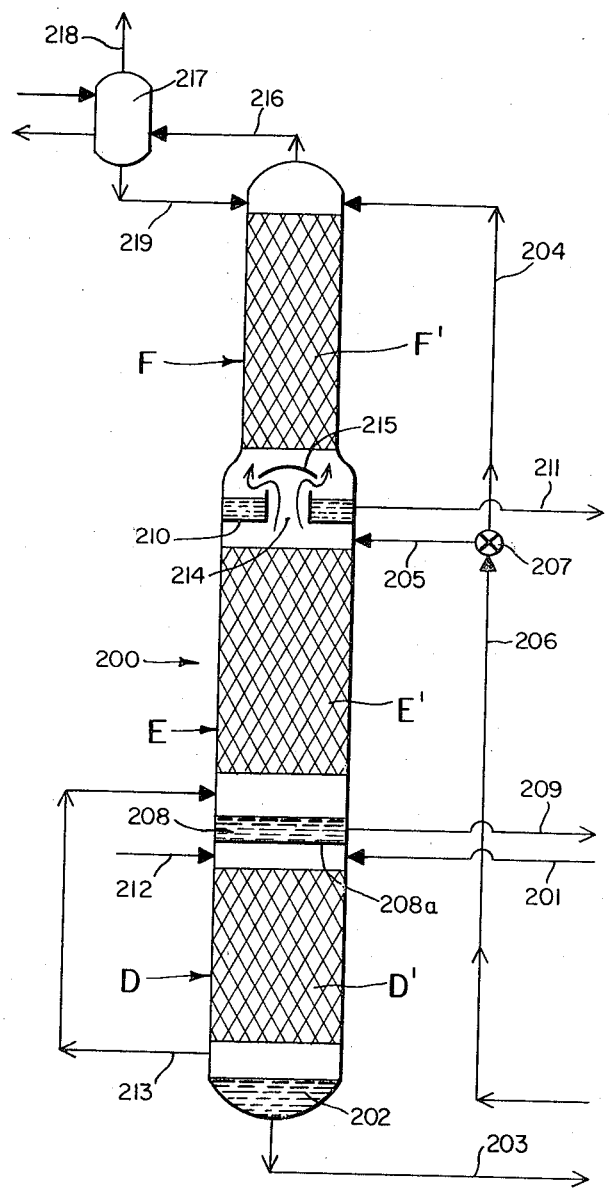

FIG. 2 is a diagrammatic flow sheet illustrating a second embodiment of the invention employing three separate absorption zones in which the first of the zones employs cocurrent gas and liquid flows.

Referring now to FIG. 1, this figure illustrates a system which is particularly suitable when it is desired to reduce the concentration of acid gas down to levels of e.g., 1 percent to 3 percent. The reference numeral 10 refers generally to an absorber column adapted to operate at substantial superatmospheric pressures and divided into two separate absorption zones generally designated by the letter A and the letter B. The cross-hatched section A' of the lower absorption zone A represents suitable packing material for producing intimate gas-liquid contact, such as Raschig rings, Berl saddles, Intalox saddles, or other types of packing bodies exposing a large surface area of liquid to the gas stream flowing through the packing. Means other than packing materials, such as plates equipped with bubble caps, sieve trays, or other means for insuring intimate contact between gas and liquid may alternatively be employed.

Lower section A of the absorber is separately supplied with a regenerated stream of scrubbing solution, such as an aqueous potassium carbonate solution, by line 11 which flows down over the packing or trays in section A', and collects at the bottom of the tower in sump 12 and is removed from the tower by line 13. The upper zone B of the absorber is provided with packing or other suitable gas-liquid contact means designated by cross-hatched section B'. The upper zone B is supplied with regenerated scrubbing solution by line 14 which flows downwardly over packing or trays B' and collects at the bottom of zone B on collector plate 15 and is separately withdrawn from the bottom of zone B by line 16. The gas stream to be treated, containing a high partial pressure of $CO_2$ and/or $H_2S$, enters the bottom of tower 10 by line 17 and flows countercurrently to the descending liquid through absorber zone A and then passes through chimney 18 provided in collecting plate 15, and then flows countercurrently to the descending liquid through zone B of the absorber and leaves the absorber in a purified condition through line 19 at the top. If necessary, the gas leaving the absorber may be passed through a cooler-condenser to condense out water vapor, producing an aqueous condensate. A portion or all of the aqueous condensate may be returned to the top of the absorber, if desired, to maintain the water balance in the system.

It will be noted that zone A and zone B of the absorber 10 are entirely separate from one another with respect to the flow of scrubbing solution. That is, each section is separately supplied with its own stream of scrubbing solution, and each stream of scrubbing solution is separately withdrawn from the bottom of each zone. Thus, zone A is supplied with solution by line 11 and solution is withdrawn from zone A by line 13. Zone B is supplied with solution by line 14 and spent scrubbing solution is withdrawn from the bottom of zone B by line 16. It will be noted that solution flowing down through zone B is prevented from entering zone A by collector plate 15 and by a deflector cap 20 positioned over the chimney 18 which permits gas to pass upwardly from zone A to zone B while preventing the flow of solution from zone B to zone A.

In order to achieve the desired reduction in absorber diameter, the flow of scrubbing solution through each of the separate absorption zones A and B should be approximately equal. That is, the flow of regenerated scrubbing solution entering the top portion of the absorber through line 14 should be approximately equal to the flow of regenerated scrubbing solution entering the bottom zone of the absorber through line 11. With this arrangement, the rate of liquid flow in any portion of the absorber in the two-zone embodiment of FIG. 1 is reduced by approximately 50 percent. Due to the reduced liquid flow and correspondingly reduced tendency of the column to flood, this typically permits a reduction in the column cross-sectional area of approximately 40 percent.

In order to utilize efficiently the carrying capacity of the scrubbing solution, and thus to minimize absorber volume, approximately equal quantities of acid gas are absorbed in each of the separate absorption zones, with the scrubbing solution operating in each zone at approximately practical maximum carrying capacity.

In the embodiment of FIG. 1, regeneration of the solution occurs in designated by the reference numeral 21, having a cross-hatched section a regeneration column designated provided with suitable packing, plates, or other means for insuring intimate gas-liquid contact.

Spent scrubbing solution leaving the bottom of zone B by line 16 and the bottom of zone A by line 13 is conducted to junction 22 where the two streams are combined. The solution then travels by line 23 to pressure letdown valve 24 where the pressure is reduced to the pressure prevailing at the top of regeneration column 21, and then passes by line 25 to the top of the regeneration column where, because of the reduction in pressure, a portion of the absorbed acid gas, together with some steam, flashes off from the solution, which then flows downwardly over section C countercurrently to stripping steam introduced by line 32, and collects at the bottom of regeneration column 21 in sump 26. Stripping steam for regeneration of the scrubbing solution is provided by reboiler 27 heated by steam coil 28. Scrubbing solution from sump 26 is circulated through reboiler 27 by line 29 and line 31. Scrubbing solution entering by line 29 passes over steam coil 28 and is heated to boiling, the steam evolved being introduced by line 32 into the bottom of the regeneration column. The solution overflows baffle 30 and is returned to sump 26 by line 31.

A mixture of steam and acid gas collecting at the top of the regeneration column is withdrawn by line 33 and passed through cooler-condenser 34 where a portion of the water vapor content is condensed and the aqueous condensate returned to the top of the regeneration tower by line 36 maintain the desired water balance in the system. The mixture of residual water vapor and acid gas from condenser 34 is withdrawn by line 35 for any desired use.

Hot, regenerated scrubbing solution from sump 26 is passed by line 37, recycle pump 38 and line 39 to a flow control valve 40 where it is split into two approximately equal portions, one flowing by line 11 to the top of zone A and the other flowing by line 14 to the top of zone B of the absorber.

It will be noted in the embodiment of FIG. 1 that all of the hot, regenerated scrubbing solution is returned to the absorber without cooling such that both the regeneration and absorption stages operate isothermally, i.e., without heating or cooling between the two stages, providing optimum thermal efficiency.

EXAMPLE

A natural gas stream containing 45 percent by volume of $CO_2$ 0.25 grains per 1,000 cubic feet of $H_2S$, with the remainder being essentially methane, at a total pressure of 700 pounds per square inch (partial pressure of $CO_2$ equals 315 pounds), and at a temperature of 270° C., is treated in accordance with the invention to provide a purified gas containing a residual $CO_2$ content of 3 percent by volume and essentially no $H_2S$. This gas stream, flowing at the rate of 3,200,000 cubic feet per hour, is treated in the system shown in FIG. 1. The two zones of the absorber are each supplied through lines 11 and 14 with 177,280 gallons per hour of an aqueous solution of potassium carbonate containing 30 percent by weight of potassium carbonate and 3 percent by weight of diethanolamine. The solution temperature entering the absorber through lines 11 and 14 is 108° C. Approximately one-half of the $CO_2$ content of the raw gas stream is removed in each of zones A and B, the purified gas stream leaving through line 19 containing a residual $CO_2$ content of 3 percent. The spent solution collecting at the bottom of zone A in sump 12 and at the bottom of zone B on collecting plate 15 is at a temperature of 115.5° C. (temperature rise due to the heat of absorption of the $CO_2$ in the solution). The two streams of spent solution are conducted to the regeneration tower after passing through a pressure letdown valve and are regenerated at atmospheric pressure by countercurrent contact with stripping steam in section C. The regenerated solution collects at the bottom of the regeneration tower at a temperature of 108° C., and is returned to the two zones of the absorber by recycle pump 38, without any cooling except for normal heat losses.

Employing a two-zone absorber as described in the above example, an absorber inside diameter of 9.25 feet is employed for both zones, corresponding to a cross-sectional area of 67.1 square feet. Using a conventional, one-zone absorber wherein the gas stream contacts the entire liquid flow, the absorber diameter required is 12.5 feet, corresponding to a cross-sectional area of 122 square feet. Accordingly, through the use of the invention, a 45 percent reduction in cross-sectional area is made possible. This marked reduction in cross-sectional area greatly reduces the problems of fabrication, particularly in view of the high pressures involved, and reduces the size and complexity of the liquid distributors and structural support members required within the column.

The invention is generally applicable to gas mixtures in which the partial pressure of acid gas ($CO_2$ and/or $H_2S$) in the raw feed gas is at least about 25 pounds per square inch, and preferably at least about 40 pounds per square inch. These minimum partial pressures of acid gas are necessary for the applicability of the invention since the gas stream which enters the second, or subsequent, absorption zones is partially depleted in acid gas, and encounters scrubbing solution which has already absorbed a substantial amount of acid gas. For this reason, a substantial initial partial pressure of acid gas in the feed gas is necessary to provide the required driving forces for absorption in the second, or subsequent, absorption zones. In typical applications of the invention, the acid gas partial pressure in the feed gas will be in the range of from 60 to 500 pounds per square inch.

The invention is applicable both to cool and hot gas mixtures. As applied to hot, steam-containing gas mixtures (such as obtained by the reforming of natural gas or naphtha, or partial oxidation of carbonaceous fuels), the method of the invention has particular advantages in that it tends to optimize the temperature profile in the absorber. The first zone of the absorber contacted by the hot gas tends to operate at a relatively high temperature since the reduced volume of solution flowing in the first zone absorbs a substantial proportion of the heat content of the hot gas by direct-contact heat exchange. This permits the upper zones of the absorber to operate at a relatively cooler temperature, thereby improving the driving forces (differential between the back pressure of acid gas from the solution and the partial pressure of acid pressure of in the gas phase) by lowering the back pressure of acid gas from the solution. If part or all of the solution fed to the second or subsequent zones of the absorber is cooled, this effect is still further enhanced. This improvement in the temperature profile in the absorber column may typically permit the reduction of packing volume or plate area in the absorber by 10 percent to 15 percent with a corresponding reduction in the overall volume of the absorber column.

The total pressure in the absorption zones should be maintained at substantial superatmospheric pressures of at least 100 pounds per square inch gage, and preferably at least 200 pounds per square inch gage. Absorber pressures in typical applications of the invention will generally range from 250 to 1,500 pounds per square inch gage.

As pointed out previously, the flow of scrubbing solution to each zone of the absorber should be approximately equal. If the scrubbing solution flow in each zone is not maintained approximately equal, the desired reduction in absorber cross-sectional area will not be achieved.

The quantity of acid gas absorbed in each zone should also be approximately equal. Since the flow rate of scrubbing solution through each zone is approximately equal, this requires that the amount of acid gas absorbed per unit volume of solution (e.g., expressed as cubic feet of acid gas absorbed per gallon) should be approximately equal in each zone. This will generally be achieved by supplying each zone with fresh, regenerated solution which has been regenerated to approximately the same degree and withdrawing solution from the bottom of each zone which is spent to approximately the same degree.

It is desirable, of course, in each absorption zone to utilize close to the full practical carrying capacity of the solution since the thermal efficiency drops off and the required solution circulation rate increases if only a portion of the solution-carrying capacity is utilized. Thus, for example, when utilizing an aqueous potassium carbonate solution to absorb $CO_2$, it is desirable to employ a solution in both absorption zones which has been regenerated to a relatively lean potassium carbonate fraction* (*The "potassium bicarbonate fraction," as used herein, means the proportion of original potassium carbonate ($K_2CO_3$) expressed in percent which has been converted to potassium bicarbonate by reaction with $CO_2$. For example, a solution having a potassium bicarbonate fraction of 25 percent is obtained by the conversion of 25 mol percent of the potassium carbonate content of the solution to potassium bicarbonate such that the ratio of potassium ions present as potassium carbonate to potassium ions present as potassium bicarbonate is 3:1. Since two mols of potassium bicarbonate are produced for each mol of potassium carbonate, the mol ratio of $K_2CO_3$:$KHCO_3$ at a 25 percent bicarbonate fraction is 3:2.) of e.g., 25 percent to 40 percent, and to maintain a rich potassium bicarbonate fraction leaving each absorption zone of e.g., 65 percent to 85 percent.

In general, any regenerable aqueous alkaline scrubbing solution may be employed in the system of the invention. Particularly preferred are aqueous solutions of potassium carbonate, particularly relatively concentrated potassium carbonate solutions having potassium carbonate concentrations by weight of 15 percent to 45 percent, and preferably from about 22 percent to 35 percent (these concentrations by weight being calculated on the assumption that all the potassium present is present as potassium carbonate). Such potassium carbonate solutions are preferably activated by the addition of additives such as ethanolamines, alkali metal borates such as potassium or sodium borate, $As_2O_3$, amino acids such as glycine, or other additives which tend to increase the rates of absorption and desorption of acid gas in the potassium carbonate solution.

Particularly preferred among these activators for potassium carbonate solutions are the alkanolamines which are preferably added to the potassium carbonate solutions in amounts ranging from about 1 percent to 10 percent by weight, and preferably from about 2 percent to 6 percent by weight. Diethanolamine, $HN(CH_2CH_2OH)_2$, is preferred from the standpoints of cost, relatively low volatility, and effectiveness. However, monoethanolamine, $H_2NCH_2CH_2OH$, or triethanolamine, $N(CH_2CH_2OH)_3$, may also be employed in place of diethanolamine, or mixtures of any two or three of these ethanolamines may be employed as additives to potassium carbonate solutions.

In addition to the potassium carbonate solutions, with or without activators, other regenerable aqueous alkaline scrubbing solutions may be employed such as aqueous solutions of the ethanolamines or aqueous solutions of the alkali metal phosphates such as potassium phosphate.

As is well known, the reactions occurring during absorption and regeneration differ depending upon the particular scrubbing solution employed. In the case of potassium carbonate, the absorption of $CO_2$ produces potassium bicarbonate while regeneration or desorption releases $CO_2$, producing potassium carbonate. As is also well known, the reversible absorption and desorption reactions do not go to completion in either the absorption or regeneration stages, and consequently the scrubbing solution, as circulated, is actually a mixture. In the case of potassium carbonate solutions, for example, the regenerated scrubbing solution fed to the absorber in the case of $CO_2$ absorption is a carbonate-bicarbonate mixture rich in carbonate while the solution leaving the absorber is a mixture rich in bicarbonate. References herein to scrubbing solutions of potassium carbonate, ethanolamines, potassium phosphate are, of course, intended to include mixtures of these compounds with the reaction products formed during the absorption process.

The invention is, of course, applicable to other arrangements than that shown in FIG. 1. For example, instead of two zones, three or more absorber zones may be employed, each supplied with approximately equal flows of scrubbing solution.

In some cases, it may be highly desirable to employ cocurrent gas and liquid flow in the first zone of the absorber contacted by the gas stream. A three-zone system employing cocurrent gas and liquid flow in the first zone is illustrated in FIG. 2 to which reference is now made.

FIG. 2, for brevity, shows only the absorber column, the regeneration column being omitted. The absorber column, generally designated by the reference numeral 200, includes three zones designated by the letters D, E, and F. Each of the zones is provided with a cross-hatched section D', E', and F', respectively, containing packing, plates, or other suitable means insuring intimate gas-liquid contact.

The first zone D of the absorber is arranged for cocurrent gas-liquid contact. Both the feed gas and the scrubbing solution enter the top of zone D by lines 212 and 201, respectively. Scrubbing solution entering by line 201 flows down over section D', collects at the bottom of zone D in sump 202, and is withdrawn for regeneration by line 203.

The upper two zones of the absorber are arranged for countercurrent gas and liquid flow. Regenerated scrubbing solution from the regenerator is conducted by line 206 to flow control valve 207 where the flow is split into two equal portions, one entering the top of zone E by line 205 and the other entering the top of zone F by line 204. Spent scrubbing solution is withdrawn from sump 208 at the bottom of zone E by line 209 for regeneration while spent scrubbing solution collects at the bottom of zone F on collecting plate 210 and is withdrawn by line 211 for regeneration.

Absorption zones D and E are separated from one another by a plate 208a.

A feed gas, such as a stream of natural gas having a total pressure of e.g., 1,000 pounds per square inch and containing e.g., 50 percent $CO_2$ is introduced at the top of zone D by line 212. The gas mixture flows downwardly cocurrent with the stream of scrubbing solution introduced by line 201 over section D', leaving the bottom of zone D, with a portion of its acid gas removed, by line 213. The gas mixture in line 213 then flows into the bottom of absorption zone E, and flows upwardly in countercurrent contact with scrubbing solution in packed section E' where further quantities of acid gases are absorbed. It then flows upwardly through chimney 214 in collecting plate 210. Deflector cap 215 is provided to prevent solution from flowing downwardly through zone F from entering zone E. The gas mixture then passes upwardly in countercurrent contact with scrubbing solution in packed section F' where the bulk of the remainder of the acid gas is absorbed, and then leaves the absorption tower by line 216, flows through cooler-condenser 217 and leaves the system by line 218, aqueous condensate being refluxed to the absorber by line 219.

The principal advantage of providing for cocurrent gas and solution flow in the first section of the absorber is a sharp increase in the capacity of this zone to handle high gas and liquid flows without flooding. In countercurrent gas-liquid flow, where the gas passes upwardly countercurrent to the liquid, the gas throughput is limited by the so-called "flooding limit" at which the frictional forces exerted by the gas stream on the downwardly flowing liquid become so great as to impede the normal downward flow of liquid, resulting in excessive liquid holdup, excessive pressure drop, and excessive entrainment of liquid in the gas stream. In cocurrent gas and liquid flow, on the other hand, there is no flooding limit, and much higher gas and liquid rates can be employed.

Where the initial partial pressure of acid gas is quite high, e.g. 100 pounds per square inch or higher, cocurrent flow is advantageously employed in the first absorption zone in order to minimize the diameter of the absorption tower in that zone. The first absorption zone is particularly prone to flooding where countercurrent liquid contact is employed because both the gas velocity and the density of the gas mixture in many cases will be at a maximum. For example, if the feed gas is a mixture of methane, and $CO_2$, containing 50 percent $CO_2$ and flowing at a rate of one million normal cubic feet per hour, the gas flow entering the first zone will be one million normal cubic feet per hour of a gas having a density of 5.57 pounds per cubic foot, whereas in the second zone the gas mixture, now containing e.g., only 30 percent $CO_2$, will have a flow rate of 719,000 cubic feet per hour and a density of 3.25 pounds per cubic foot. If the $CO_2$ content is reduced to 15 percent enginering the third absorption zone, the gas mixture will have a flow rate of 588,000 cubic feet per hour, and a density of 2.58 pounds per cubic foot. Despite the high gas flow and gas density in the first zone, by the use of cocurrent gas and liquid flow, a smaller absorber diameter can be employed in the first absorber section than would otherwise be permissible. Thus, as shown in FIG. 2, although both the gas flow and gas density are substantially higher in absorber section D, the same tower diameter is employed as in section E.

While it is possible to employ cocurrent gas and liquid flow in the first section of the absorber in cases where the partial pressure of acid gas in the raw feed gas is high, countercurrent flow will generally be desirable in the upper sections of the absorber where the partial pressure of acid gas is progressively decreasing.

Other embodiments of the invention than those specifically described are intended to be included within the scope of the invention. For example, other regeneration systems than that specifically disclosed may be employed, using, for example, zoned regenerators which separately regenerate the streams of solution from the various zones of the absorber. Similarly, other arrangements of the internals of the absorber than those shown may be employed. For example, in the system of FIG. 1, instead of piping the solution collecting on collecting plate 15 at the bottom of zone B to mixing point 22, external of the absorber column, the solution on plate 15 may be piped to the bottom of the column and introduced into sump 12 and thus mixed with the solution collecting at the bottom of zone A before leaving the absorber column.

In systems where it is desired to reduce the acid gas content of the raw gas to low levels such as 500 to 3,000 parts per million, part or all of the solution fed to the last zone of the absorber contacted by the gas stream is preferably cooled to reduce the back pressure of acid gas above the solution.

It will be recognized, of course, that the illustrative flow diagrams do not include all the auxiliaries or instrumentation required for the practical operation of a commercial plant. It is intended, of course, that such auxiliaries and other items required by sound engineering practice but not specifically shown will be employed in carrying out the system of the invention.

I claim:

1. A method for removing acid gases selected from the group consisting of $CO_2$ and $H_2S$ from gas mixtures containing a high partial pressure of such acid gases of at least 25 pounds per square inch comprising the steps of contacting said gas mixture with an aqueous alkaline scrubbing solution in an absorption tower maintained under substantial superatmospheric pressure and containing at least two superimposed absorption zones, separately supplying the top of each of said absorption zones with approximately equal separate streams of regenerated scrubbing solution, withdrawing said separate streams of scrubbing solution from the bottom of each absorption zone in a spent condition, and without further contact with said gas mixture feeding said streams of spent solution to a common regeneration zone where said streams are subjected while mixed with one another to regeneration at a reduced pressure in the vicinity of atmospheric pressure, withdrawing regenerated solution from said common regeneration zone and dividing said regenerated solution into at least two separate and approximately equal streams and recycling each of said separate streams to the top of each of said separate absorption zones, passing said gas mixture successively through said separate absorption zones in contact with said separate streams of solution while absorbing approximately equal quantities of acid gas in each of said zones.

2. A method in accordance with claim 1 in which the partial pressure of acid gas in said gas mixture is at least about 40 pounds per square inch.

3. A method in accordance with claim 1 in which the acid gas in said gas mixture is at least predominantly $CO_2$.

4. A method in accordance with claim 1 in which said scrubbing solution comprises an aqueous solution of potassium carbonate.

5. A method in accordance with claim 1 in which said scrubbing solution is an aqueous solution of potassium carbonate containing an additive selected from the group consisting of alkanolamines, alkali metal borates, $As_2O_3$, and amino acids.

6. A method in accordance with claim 1 in which the gas mixture flows downwardly cocurrently with the scrubbing solution in the lowermost separate absorption zone of said absorption tower.

* * * * *